United States Patent
Carraux et al.

(10) Patent No.: US 7,869,996 B2
(45) Date of Patent: Jan. 11, 2011

(54) RECOGNITION OF SPEECH IN EDITABLE AUDIO STREAMS

(75) Inventors: Eric Carraux, Pittsburgh, PA (US); Detlef Koll, Pittsburgh, PA (US)

(73) Assignee: Multimodal Technologies, Inc., Pittsburgh, PA (US)

( * ) Notice: Subject to any disclaimer, the term of this patent is extended or adjusted under 35 U.S.C. 154(b) by 628 days.

(21) Appl. No.: 11/944,517

(22) Filed: Nov. 23, 2007

(65) Prior Publication Data

US 2008/0221881 A1    Sep. 11, 2008

Related U.S. Application Data

(60) Provisional application No. 60/867,105, filed on Nov. 22, 2006.

(51) Int. Cl.
*G10L 15/26* (2006.01)
(52) U.S. Cl. .................................... 704/235
(58) Field of Classification Search .................. 704/235
See application file for complete search history.

(56) References Cited

U.S. PATENT DOCUMENTS

| | | |
|---|---|---|
| 5,179,627 A | 1/1993 | Sweet et al. |
| 5,231,670 A | 7/1993 | Goldhor et al. |
| 5,970,460 A | 10/1999 | Bunce et al. |
| 6,298,326 B1 | 10/2001 | Feller |
| 7,236,931 B2 * | 6/2007 | He et al. ................. 704/235 |

| | | |
|---|---|---|
| 2004/0049385 A1 | 3/2004 | Lovance et al. |

FOREIGN PATENT DOCUMENTS

| | | |
|---|---|---|
| EP | 1094445 B1 | 2/2006 |
| JP | 1997298944 A2 | 7/1998 |
| JP | 200182024 A2 | 9/2002 |
| WO | 2004107315 A2 | 12/2004 |

OTHER PUBLICATIONS

"Dictaphone ichart Dictate" web site, visited on Dec. 13, 2006.
"Quikscribe" web site, visited on Nov. 7, 2006.
"Dictaphone Powerscribe Workstation" web site, visited on Nov. 7, 2006.

* cited by examiner

*Primary Examiner*—Susan McFadden
(74) *Attorney, Agent, or Firm*—Robert Plotkin, P.C.

(57) ABSTRACT

A speech processing system divides a spoken audio stream into partial audio streams, referred to as "snippets." The system may divide a portion of the audio stream into two snippets at a position at which the speaker performed an editing operation, such as pausing and then resuming recording, or rewinding and then resuming recording. The snippets may be transmitted sequentially to a consumer, such as an automatic speech recognizer or a playback device, as the snippets are generated. The consumer may process (e.g., recognize or play back) the snippets as they are received. The consumer may modify its output in response to editing operations reflected in the snippets. The consumer may process the audio stream while it is being created and transmitted even if the audio stream includes editing operations that invalidate previously-transmitted partial audio streams, thereby enabling shorter turnaround time between dictation and consumption of the complete audio stream.

24 Claims, 10 Drawing Sheets

RECOGNITION OF SPEECH IN EDITABLE AUDIO STREAMS

CROSS REFERENCE TO RELATED APPLICATIONS

This application claims the benefit of U.S. Prov. Pat. App. Ser. No. 60/867,105, filed on Nov. 22, 2006, entitled, "Recognition of Speech in Editable Audio Streams."

This application is related to U.S. patent application Ser. No. 10/923,517, filed on Aug. 10, 2004, entitled "Automated Extraction of Semantic content and Generation of a Structured Document from Speech," which is hereby incorporated by reference.

BACKGROUND

A variety of automatic speech recognizers exist for transcribing speech. Such systems typically may be operated in a "verbatim transcript" mode, in which all of the words spoken are transcribed in the order in which they were spoken. It is not desirable, however, to produce a verbatim transcript when the speaker performs editing operations which invalidate previously-dictated speech.

Consider, for example, a speaker dictating into a handheld digital recorder. The speaker speaks a few sentences, then realizes that he has misspoken. He desires to re-record (re-place) his previous ten seconds of speech, so he rewinds the recording by ten seconds (perhaps by pressing a rewind button on a recording device) and then begins speaking again to correct the previous ten seconds of speech.

A verbatim transcript of such speech would therefore include not only the speech which the speaker intended to become part of the final transcript, but also speech that has been replaced by other speech (e.g., the ten seconds of speech that was re-dictated), and which therefore should not become part of the final transcript. Although some existing speech recognizers are capable of producing a transcript that reflects such changes made to the spoken audio stream before the entire audio stream has been dictated, such systems do so by requiring that recognition of each portion of the audio stream be delayed for some period of time after that portion has been spoken, to ensure (or at least increase the likelihood) that the resulting transcript of that portion of the audio stream will not become invalidated by subsequent speech.

SUMMARY

A speech processing system divides a spoken audio stream into partial audio streams, referred to as "snippets." The system may divide a portion of the audio stream into two snippets at a position at which the speaker performed an editing operation, such as pausing and then resuming recording, or rewinding and then resuming recording. The snippets may be transmitted sequentially to a consumer, such as an automatic speech recognizer or a playback device, as the snippets are generated. The consumer may process (e.g., recognize or play back) the snippets as they are received. The consumer may modify its output in response to editing operations reflected in the snippets. The consumer may process the audio stream while it is being created and transmitted even if the audio stream includes editing operations that invalidate previously-transmitted partial audio streams, thereby enabling shorter turnaround time between dictation and consumption of the complete audio stream.

DETAILED DESCRIPTION

Embodiments of the present invention enable speech to be transcribed automatically and in real-time (i.e., as the speaker is speaking and before completion of the speech). Such transcription may be performed even when the speaker speaks naturally and performs editing operations, such as changing the recording position while speaking by rewinding and forwarding. Rewinding and then resuming dictation is an example of an "editing operation" as that term is used herein. Another example of an "editing operation" is pausing the recording and then resuming the recording and continuing the dictation at a subsequent time.

Portions of the speech (referred to herein as "snippets") may be transcribed without delay. In other words, a first snippet may be transcribed while it is being spoken, or without otherwise waiting for a delay period to expire, even if a subsequent snippet modifies or deletes the first snippet.

Furthermore, the speaker may dictate without the system displaying the draft transcript to the speaker while he is speaking. Rather, the draft document may be displayed to the speaker only after completion of dictation. This enables a radiologist who is dictating a report, for example, to focus on reviewing and interpreting radiology images while dictating, rather than on editing text. The speaker may be provided with the opportunity to edit the draft transcript only upon completion of dictation. This differs from conventional speech recognition systems, which typically display the draft document to the user while he is speaking, and which require the user to make changes to the dictation by making changes to the text on-screen.

Figure 1:
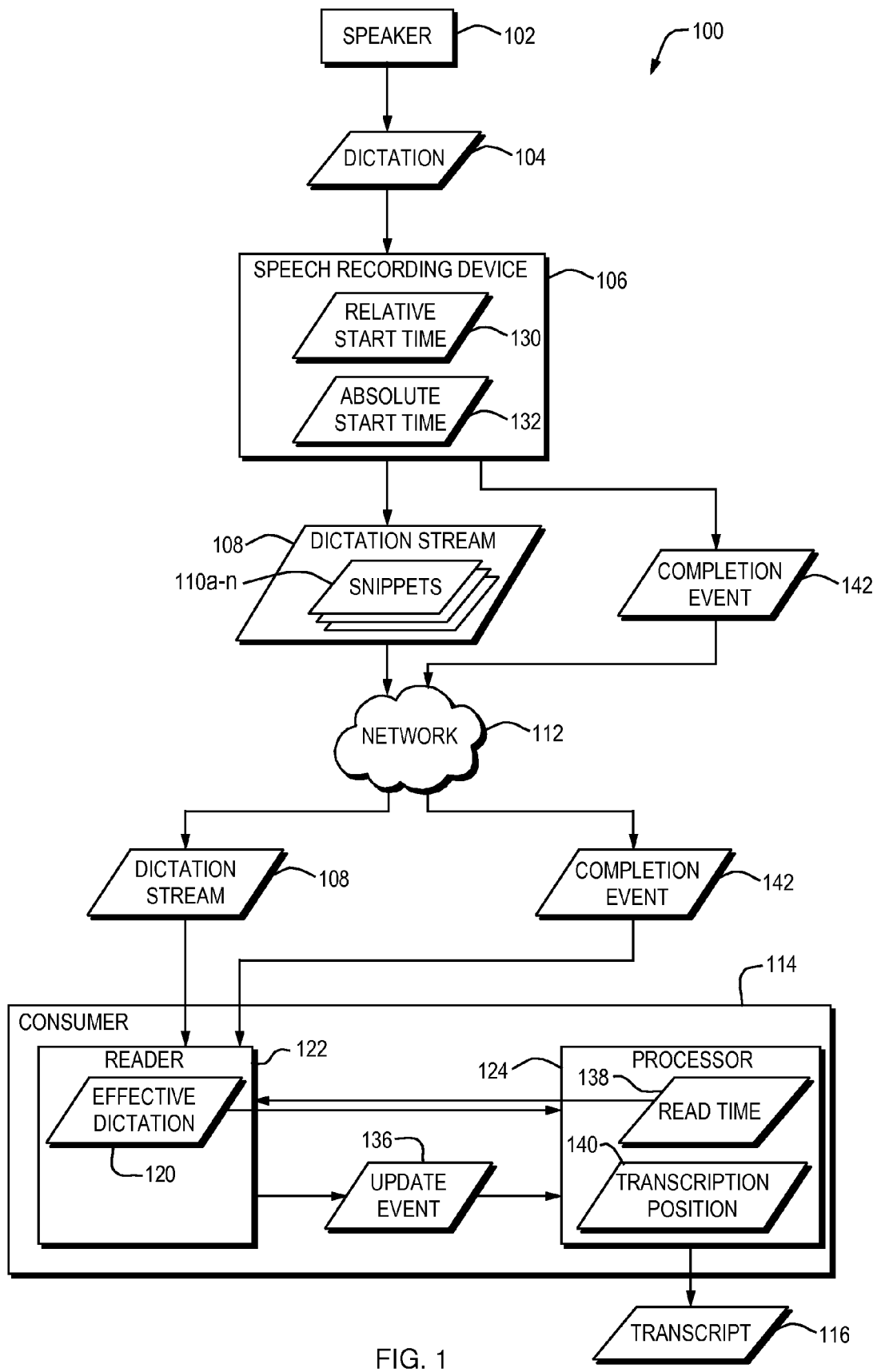
FIG. 1 is a dataflow diagram of a system for processing (e.g., transcribing or playing back) speech according to one embodiment of the present invention.
Figure 3A:
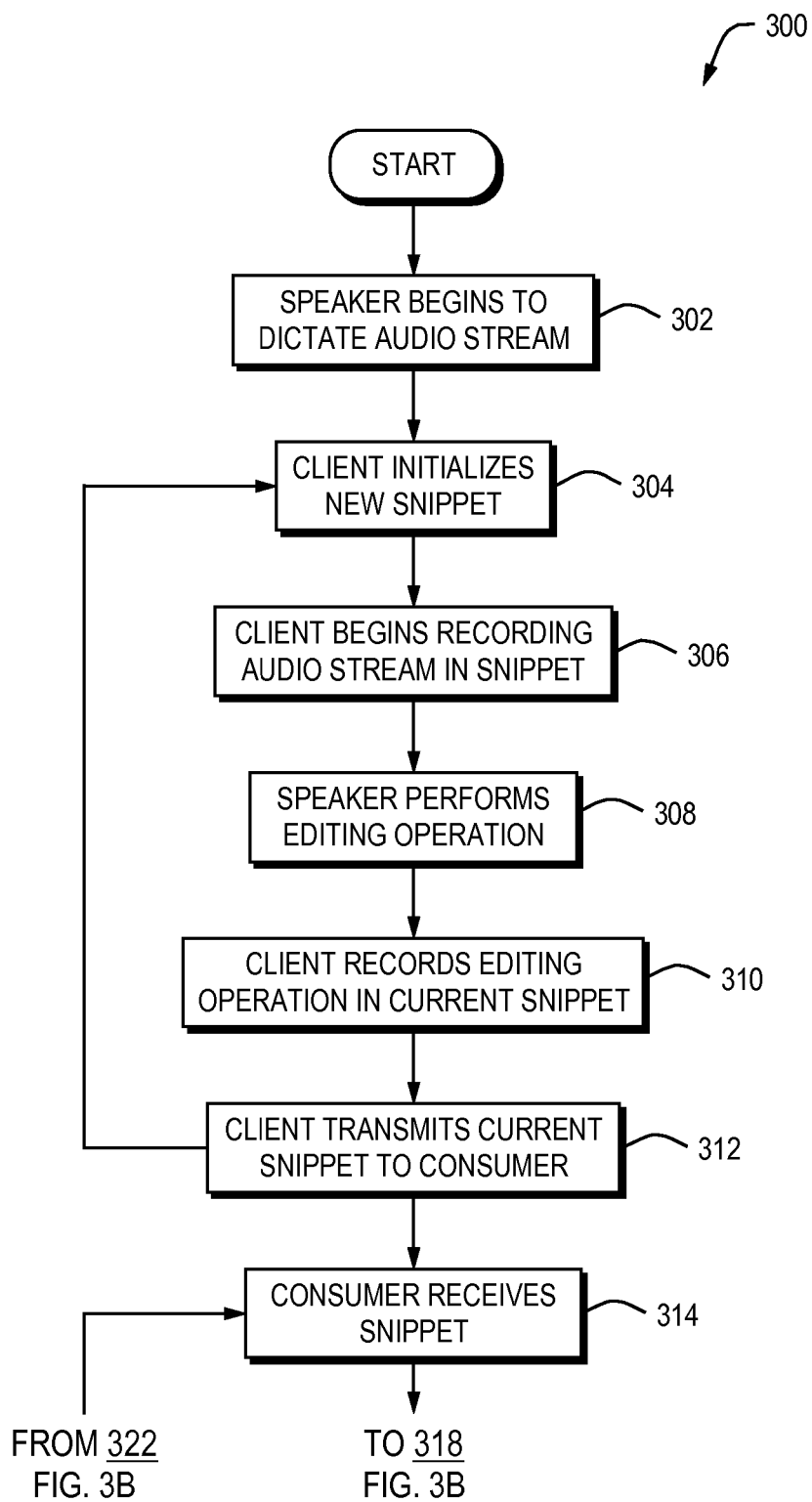
FIGS. 3A-3B are flowcharts of a method performed by the system of FIG. 1 to process speech according to one embodiment of the present invention.
Figure 3B:
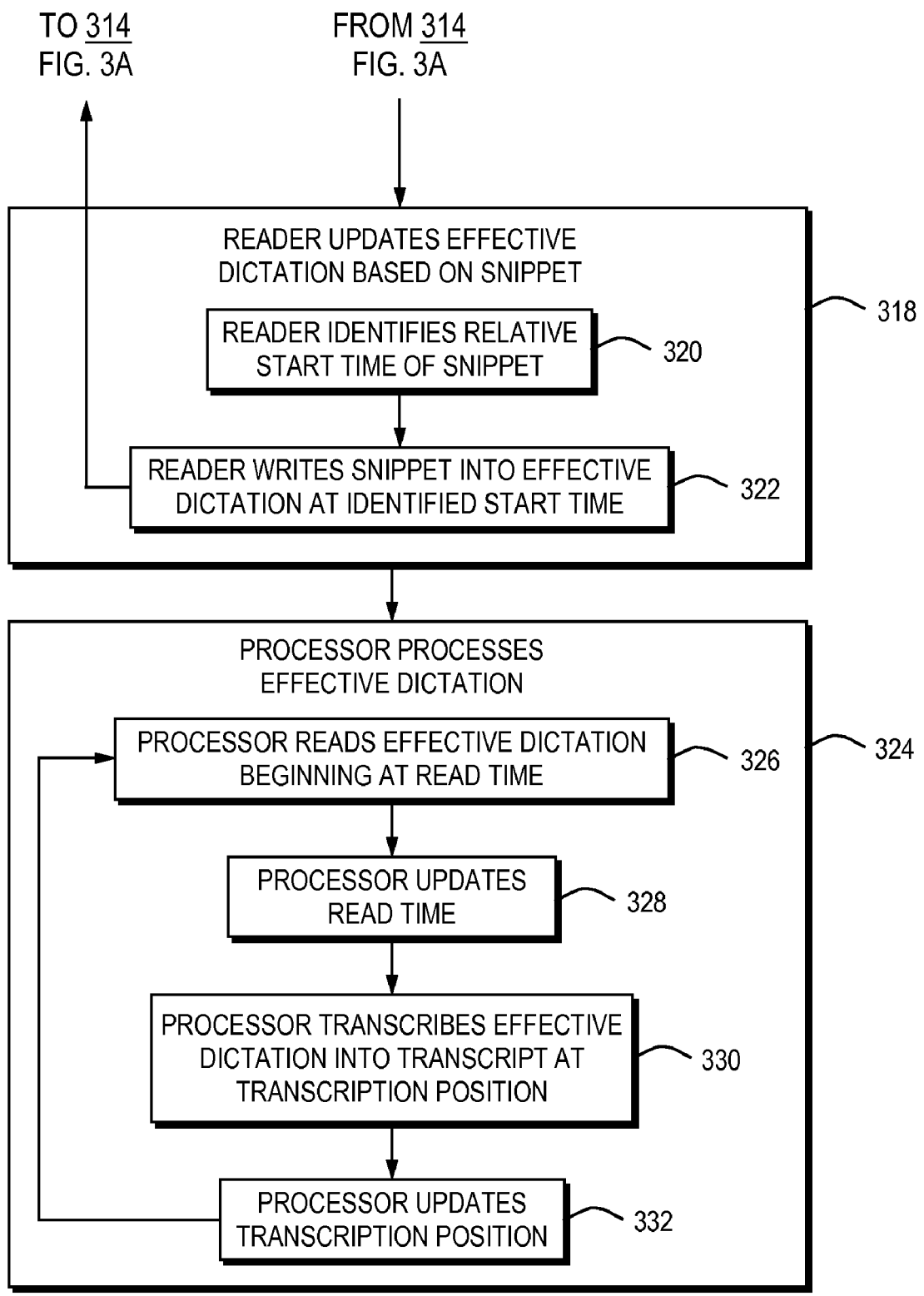

Embodiments of the present invention will now be described in more detail. Referring to FIG. 1, a dataflow diagram is shown of a system 100 for processing (e.g., transcribing or playing back) speech according to one embodiment of the present invention. Referring to FIGS. 3A-3B, flowcharts are shown of a method 300 that may be performed by the system 100 of FIG. 1 to transcribe speech according to one embodiment of the present invention.

In general, a speaker 102, such as a doctor, begins speaking into a device 106, such as a digital recording device, personal computer with connected microphone, personal digital assistant, or telephone (step 302). The speaker's speech is shown in FIG. 1 as the "dictation" 104, which refers to the entire spoken audio stream desired to be transcribed by the time the method 300 shown in FIGS. 3A-3B completes.

Figure 4:
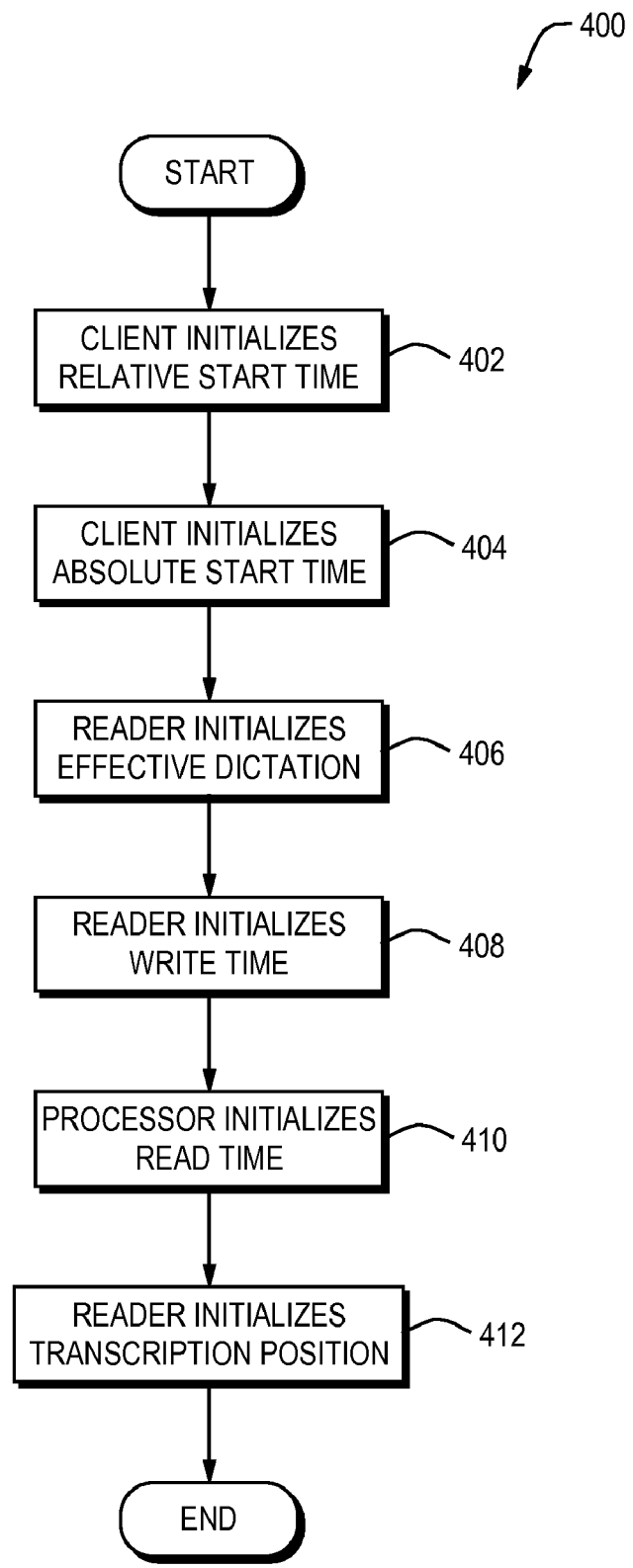
FIG. 4 is a flowchart of a method for initializing the system of FIG. 1 according to one embodiment of the present invention.

As will be described in more detail below, the recording device 106 may divide the dictation 104 into a plurality of partial audio streams, referred to herein as "snippets." While the recording device 106 is recording each snippet, the recording device may keep track of a start time 130 of the snippet relative to the beginning of the dictation 104 (or to any other reference point within the dictation 104), and a real (absolute) start time 132 of the snippet 202 (to maintain the correspondence of the snippet to other forms of user input, such as the click of a button in a GUI). When the speaker 102 begins speaking, the recording device 106 may initialize the relative start time 130 and absolute start time 132 (as shown in the method 400 of FIG. 4, steps 402 and 404, respectively).

Figure 2:
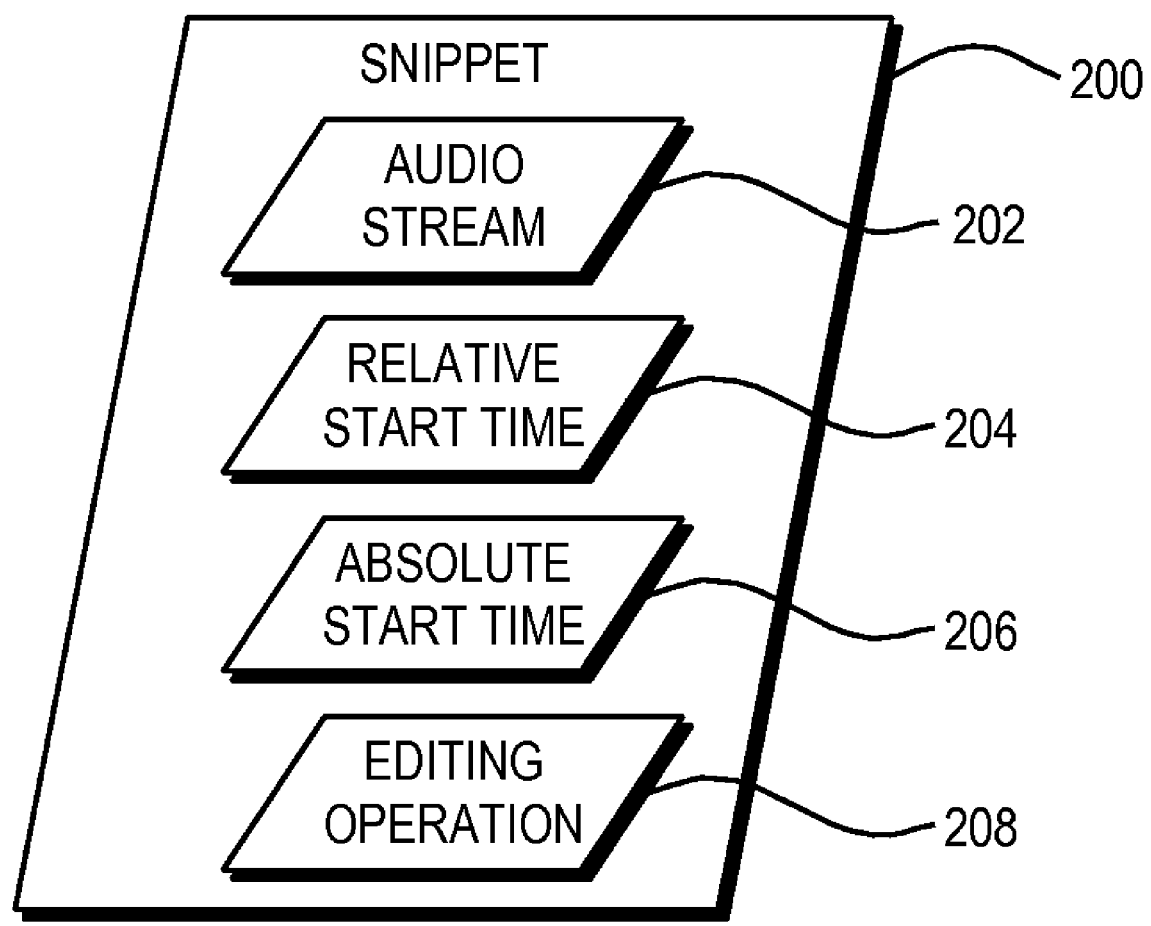
FIG. 2 is a diagram of a data structure for storing a partial audio stream ("snippet") of speech according to one embodiment of the present invention.

The recording device 106 may initialize and create a new snippet (step 304) and begin recording the currently-spoken portion of the dictation 104 into the snippet (step 306). An example data structure 200 for storing such a snippet is shown in FIG. 2. The snippet 200 may include or otherwise be associated with, for example: (1) a time-continuous audio stream 202 representing the portion of the dictation 104 associated with the snippet 200; (2) a start time 204 of the audio stream 202 relative to the beginning of the dictation 104; (3) a real (absolute) start time 206 of the partial audio stream 202; and (4) an editing operation 208 (if any) associated with the snippet 200. The recording device 106 may copy the values of the relative start time 130 and absolute start time 132 into the relative start time 204 and absolute start time 206, respectively, when the snippet 200 is initialized.

The recording device 106 may terminate the current snippet 200 if, for example, the speaker 102 uses the recording device 106 to perform an editing operation (step 308), such as pausing the recording, rewinding, or forwarding within the recording. To terminate the snippet 200, the recording device 106 may stop recording additional speech into the audio stream 202 of the snippet 200, and record information about the editing operation performed by the speaker 102 into field 208 of the snippet 200 (step 310). The recording device 106 may then transmit the current snippet 200 over a network 112 to a consumer 114, such as a human transcriptionist, automatic speech recognizer, or audio playback device (step 312). Examples of ways in which the consumer 114 may consume the snippet are described below.

Note that in the example illustrated in FIG. 3A, the current snippet 200 is transmitted to the consumer 114 after the snippet 200 is terminated. This is merely an example, however, and does not constitute a limitation of the present invention. The recording device 106 may, for example, stream the current snippet 200 to the consumer 114 before the snippet 200 is terminated. For example, the recording device 106 may begin streaming the current snippet 200 as soon as the recording device 106 begins to store the audio stream 202 in the snippet 200, and continue streaming the snippet 200 as more of the audio stream 202 is stored in the snippet 200. As a result, the consumer 114 may begin processing (e.g., recognizing or playing back) an earlier portion of the snippet 200 even as the speaker 102 is speaking, and the recording device 106 is recording and transmitting, a later portion of the same snippet 200.

As the speaker 102 continues to dictate (step 302) after termination of the current snippet, the recording device 106 may initialize a new snippet with the current values of the relative start time 130 and absolute start time 132 stored in fields 204 and 206, respectively, and with an empty audio stream 202 (step 304). The speaker 102, in other words, may continue dictating naturally as the recording device 106 breaks up the dictation 104 into a sequence of snippets 102a-n, which the recording device 106 transmits sequentially to the consumer 114 as the snippets 102a-n are created. The snippets 102a-n thereby form a dictation stream 108 that the recording device 106 transmits to the consumer 114. The dictation stream 108 may, for example, be formatted as a single sequential stream of bytes over a socket, an HTTP connection, or a streaming object according to an API.

In parallel with such continued dictation by the speaker 102 and recording of the dictation 104 by the recording device 106, the consumer 114 may receive each snippet (step 314). If, for example, the speaker 102 produces the dictation 104 using a client-side speech recording device 106, the consumer 114 may be a server-side automatic speech recognizer.

The consumer 114 may process each of the snippets 110a-n as they are received, in other words, without introducing any delay before beginning such processing. Furthermore, the consumer 114 may process one snippet while the recording device 106 continues to record and transmit subsequent snippets in the dictation stream 108. For example, if the consumer 114 is an automatic speech recognizer, the automatic speech recognizer may transcribe each of the snippets 110a-n as they are received, thereby producing a running transcript 116 of the dictation 104 as the snippets 110a-n which make up the dictation 104 are received by the consumer 114.

The consumer 114 may combine the received snippets 110a-n into a single combined audio stream, referred to herein as the "effective dictation" 120 on the consumer (e.g., server) side. In general, the goal is for the effective dictation 120 to represent the speaker's intent for the speech to be transcribed. For example, if the original dictation 104 includes ten seconds of speech which were subsequently invalidated when the speaker 102 rewound over those ten seconds of speech and then dictated over them, then the deleted (invalidated) ten seconds of speech should not appear in the effective dictation 120, even if that speech appears in the original dictation 104 and in the stream of snippets 110a-n transmitted to the consumer 114. The consumer 114 repeatedly updates the effective dictation 120 as it receives the snippets 110a-n.

More specifically, the consumer 114 may include a "reader" component 122 and a "processor" component 124. At some point before receiving the first snippet, the reader 122 initializes the effective dictation 120 to an empty audio stream (FIG. 4, step 406) and initializes a write time 134 to point to the beginning of the effective dictation 120 (step 408). The write time 134 indicates the time within the effective dictation 120 at which the reader 122 will write the next snippet.

Then, as the reader 122 receives snippets 110a-n (step 314), the reader 122 updates the effective dictation 120 based on the contents of the snippets 110a-n. The reader 122 may begin updating the effective dictation 120 as soon as it begins receiving the snippets 110a-n, and therefore before all snippets 110a-n are received. As a result, the reader 122 may be updating the effective dictation 120 based on the receipt of earlier snippets even as the reader 122 receives subsequent snippets.

When the reader 122 receives a snippet, the reader may identify the relative start time of the snippet from field 204 of the snippet (step 320). The reader 122 may then use the snippet to update the effective dictation 120 by writing the contents of the snippet's audio stream 202 into the effective dictation 120 at the identified start time (step 322).

The reader 122 may "write" the audio stream 202 into the effective dictation 120 in a variety of ways. For example, the reader 122 may write the audio stream 202 into the effective dictation 120 in an "overwrite" mode, in which the reader 122 overwrites data currently stored at the identified start time (step 320) in the effective dictation 120 with data from the new snippet. As another example, the reader 122 may write the audio stream 202 into the effective dictation 120 in an "insert" mode, in which the reader 122: (1) inserts the current snippet into the effective dictation 120, beginning at the start time identified in step 320; and (2) increases the relative start times of subsequent snippets which are already stored in the effective dication 120 by an amount equal to the duration of the newly-inserted snippet. As yet another example, the reader 122 may write the audio stream 202 into the effective dictation 120 in a "truncate" mode, in which the reader 122: (1) overwrites data currently stored at the identified start time (step 320) in the effective dictation 120 with data from the new snippet; and (2) erases any data in the effective dictation 120 after the newly-written snippet.

The reader 122 may decide whether to write the current snippet into the effective dictation 120 using the overwrite, insert, or truncate mode in any of a variety of ways. For example, the reader 122 may be configured to write all of the snippets 110a-n in a particular dictation stream 108 using the same mode (e.g., overwrite or insert). As another example, the editing operation field 208 of each snippet may specify which mode should be used to write that snippet.

If the relative start time 204 of the current snippet points to or beyond the end of the effective dictation 120, then the reader 122 may append the audio stream 202 of the current snippet to the effective dictation 120, regardless of whether the reader 122 is operating in overwrite mode or insert mode.

Consider how the operation of the reader 122 just described would affect the effective dictation 120 in the case of two particular kinds of editing operation: "pause recording" and "pause and rewind." In the case of pause recording, the speaker 102 pauses recording at the recording device 106, and then re-starts recording at a later "real" (absolute) time. In response to this, the recording device 106 may terminate the current snippet and create a new snippet when the speaker 102 resumes recording, as described above with respect to FIG. 3A. The resulting two snippets contain audio streams representing the speech before and after the pause, respectively. In this case, the recording device 106 may set the relative start time of the second of the two snippets to be equal to the relative end time of the first snippet.

When the reader 122 receives the first and second snippets, the reader 122 may perform steps 320-322 to effectively combine both snippets into a single long audio stream because the relative end time of the first snippet matches the relative start time of the second snippet. This reflects the likely intent of the speaker 102, which was to create a single continuous audio stream from the two snippets.

In the case of "pause and rewind," the speaker 102 pauses the recording at the recording device 106, rewinds, and resumes speaking. In this case, the recording device 106 may create two snippets within the dictation stream 108: one for the speech that was spoken before the pause/rewind was performed, and one for the speech that was spoken after the pause/rewind was performed. The relative start time of the second recorded snippet may be set to be earlier than the relative end time of the first recorded snippet, by an amount corresponding to the duration of the rewind, thereby reflecting the effect of the rewind operation. As a result, the first and second recorded snippets may be non-contiguous in time, relative to the start time of (or other reference point within) the dictation 104.

When the reader 122 receives the first of these two snippets, the reader will first write the first snippet into the effective dictation by performing steps 320-322. Then, when the reader 122 receives the second of these two snippets, the reader 122 will insert that snippet at a location earlier in the effective dictation, corresponding to the earlier relative start time of the second snippet, thereby reflecting the effect of the rewind operation.

The techniques just described differ from those employed by existing transcription systems, in which partial audio streams are combined into a single combined audio stream as soon as they are created. In other words, in existing systems the partial audio streams are not retained (as they are in the dictation stream 108 herein), and a single audio stream is transferred to the consumer for processing (e.g., transcription or playback). In order to allow rewinding, the combined audio stream typically is transferred to the consumer after a sufficient delay to ensure, or at least decrease the likelihood, that the partial audio streams that have already been transferred to the consumer will not be modified by subsequent editing operations.

One disadvantage of such systems is that there can never be an absolute guarantee that a subsequent editing operation will not modify previous speech, even after a long delay has passed. For example, even in a system with a five minute delay, the speaker may speak for ten minutes before deciding to re-start the dictation from scratch. Another disadvantage of such systems is that the delays they introduce delay the production of the transcript.

In embodiments of the present invention, in contrast, an audio stream reflecting the application of editing operations is not transferred to the consumer 114 (e.g., speech recognizer). Instead, the series of partial audio streams (snippets 110a-n) is transferred, including even audio streams that are modified or deleted by subsequent audio streams.

Examples of ways in which the processor 124 may process the effective dictation 120 (step 324) will now be described. In general, the processor 124 may operate in parallel with other elements of the system 100, such as the recording device 106 and the reader 122. Upon initialization of the system (FIG. 4), the processor 124 may initialize a read time 138 to zero (step 410). The read time 138 points to the location within the effective dictation from which the processor 124 will read next. The processor 124 may also initialize a transcription position 140 to zero (step 412). The transcription position points to the location within the transcript 116 to which the processor will next write text.

Once the reader 122 begins storing audio data in the effective dictation 120, the processor 124 may begin reading such data, beginning at a location within the effective dictation 120 specified by the read time 138 (step 326). In other words, the processor 124 need not wait any amount of time before beginning to read and process data from the effective dictation 120.

The processor 124 updates (increases) the read time 138 as the processor 124 reads audio data from the effective dictation (step 328).

The processor 124 transcribes the portion of the effective dictation 120 that was read in step 326 to produce transcribed text, and writes such text into the transcript 116 at the current transcription position 140 (step 330). The processor 124 updates the current transcription position 140 to point to the end of the text transcribed in step 330 (step 332). The processor 124 returns to step 326 to continue reading and processing audio from the effective dictation 120.

Note that the processor 124 may perform functions other than and/or in addition to transcription. For example, the processor 124 may perform playback of the audio in the effective dictation 120 instead of or in addition to transcribing the effective dictation.

There is no guarantee that any of the data that the processor 124 reads from the effective dictation 120 and processes will be part of the final recording, for the reasons provided above. For example, after the processor 124 transcribes a portion of the audio in the effective dictation 120, that portion of the audio may be deleted or overwritten within the effective dictation 120 by subsequently-received snippets.

Figure 3C:
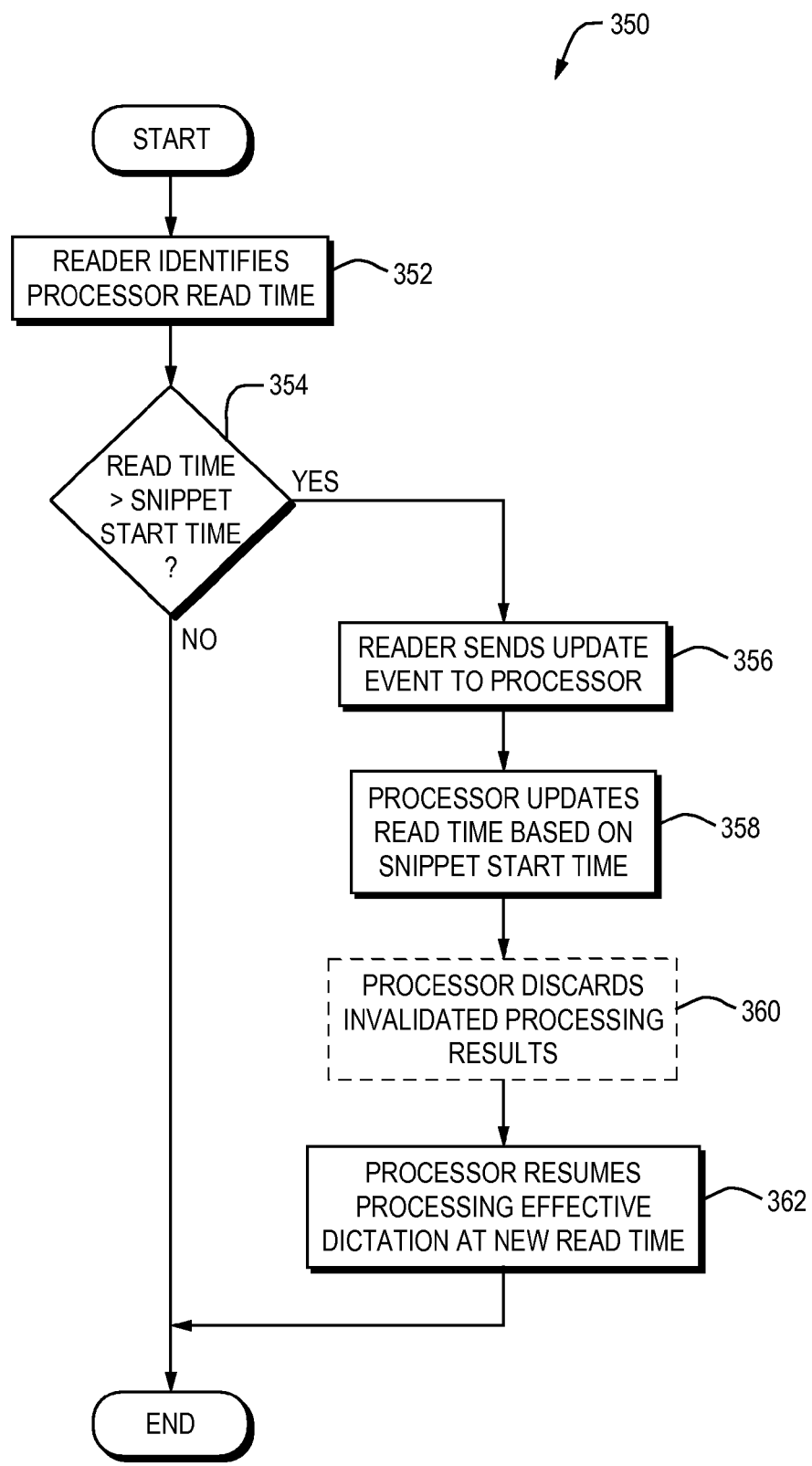
FIG. 3C is a flowchart of a method used by a consumer of speech to respond to invalidation of previously-processed speech by an editing operation according to one embodiment of the present invention.

Referring to FIG. 3C, a flowchart is shown of a method 350 that the consumer 114 may use to respond to such invalidation of previously-processed audio will now be described. The reader 122 may have access to the current read time 138 of the processor 124. The reader 122 may read the processor read time 138 (step 352) (such as after identifying the relative start time of the snippet in step 320 of FIG. 3B), thereby enabling the reader 122 to detect whether the snippet currently being processed by the reader 122 invalidates portions of the effective dictation 120 that the processor 124 has already processed. More specifically, the reader 122 may compare the relative start time 204 of the snippet currently being processed by the reader 122 to the read time 138 of the processor 124. If that relative start time 204 is earlier than the read time 128 (step 354), then the reader 122 may provide an update event 136 to the processor 124 (step 356), indicating that already-processed data are no longer valid.

The update event 136 may include information such as the relative start time of the snippet being processed by the reader 122. In response to receiving the update event 136, the processor 124 may change its read time 138 to the relative start time indicated by the update event 136 (step 358), and then resume processing the effective dictation 120 beginning at the new read time 138 (step 362).

The method 350 shown in FIG. 3C is merely an example of how the consumer 114 may respond to receipt of a snippet which invalidates a previously-processed snippet. The appropriate response to the update event 136 depends on the consumer 114. For example, if the consumer 114 is an audio player, the audio player may ignore the event 136, because it is not possible to "un-play" audio. If, however, the consumer 114 is an automatic speech recognizer, then the speech recognizer may discard partial recognition results (such as text and/or partial hypotheses) that correspond to the now-invalid part of the effective dictation 120 (step 360), and restart processing (recognition) at the new read time 138 within the effective dictation 120 (step 362). Discarding partial recognition results in step 360 may involve deleting text from the current version of the transcript 116 corresponding to speech which is no longer part of the effective dictation 120, and updating the transcription position 140 to correspond to a position within the transcript 116 that corresponds to the new read time 138.

Figure 3D:
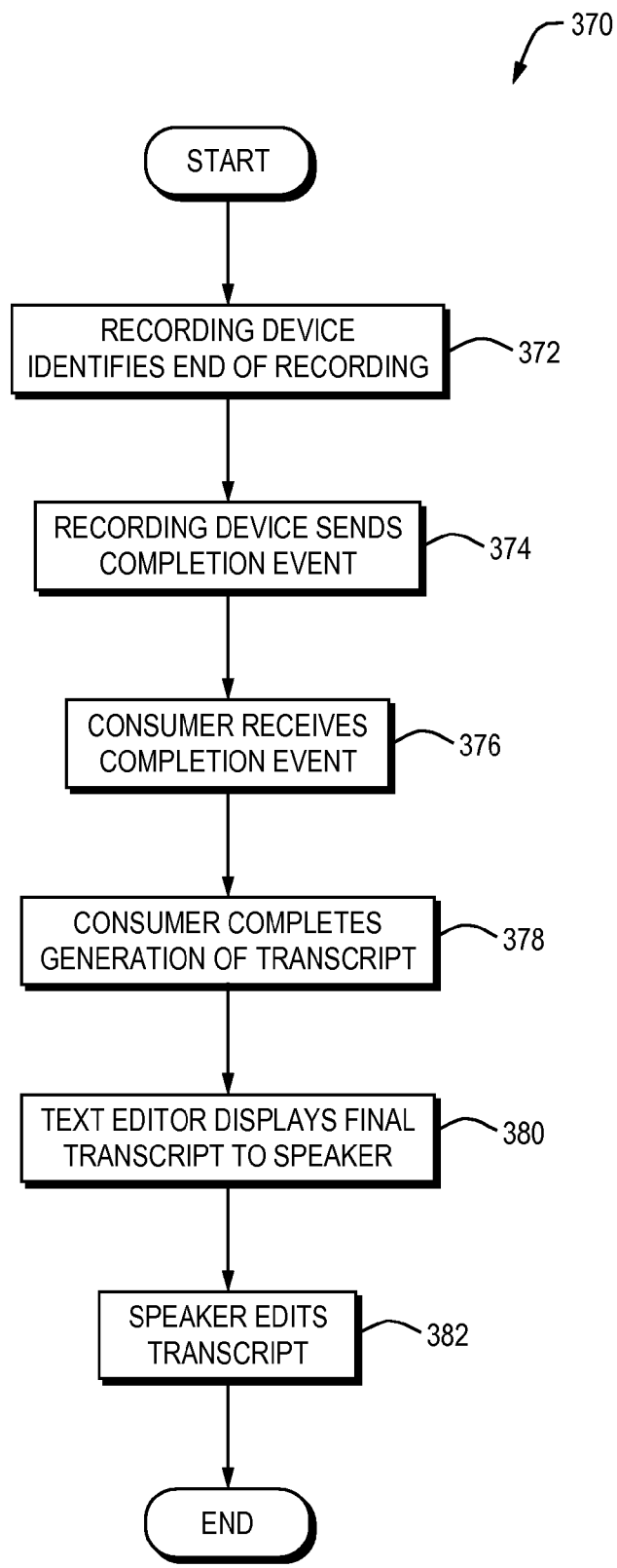
FIG. 3D is a flowchart of a method for completing the creation of a transcript of speech and enabling a user to edit that transcript according to one embodiment of the present invention.

Referring to FIG. 3D, a flowchart is shown of a method 370 that the system 100 may perform upon completion of the dictation 104. When the recording device 106 detects that the speaker 102 has finished dictating the dictation 104 (step 372), the recording device 106 may send an indication 142 of the completion of dictation to the consumer 114 (step 374), in response to which the consumer 114 may finalize processing of the dictation stream 108 to produce the final version of the transcript 116, which reflects any editing operations performed by the speaker 102 (steps 376 and 378).

Figure 5:
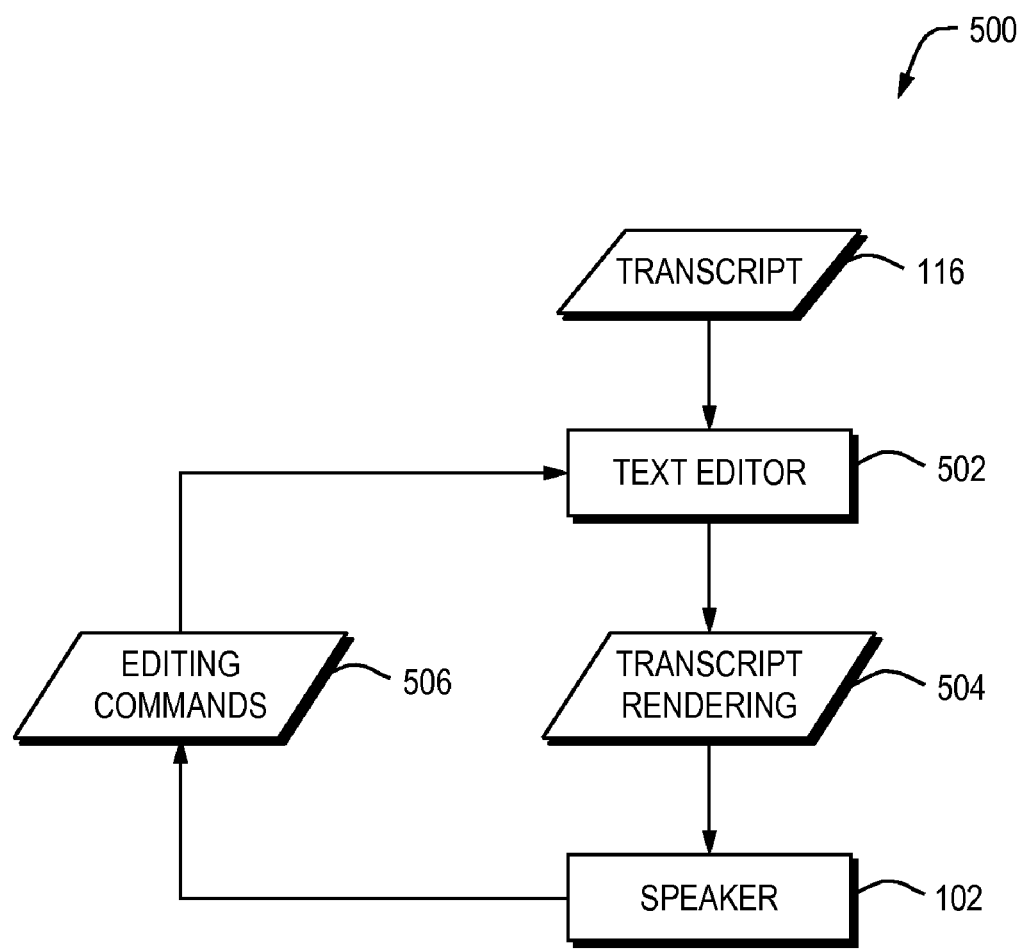
FIG. 5 is a dataflow diagram of a system for displaying and editing a transcript according to one embodiment of the present invention.

Once the final transcript 116 is complete, a text editor 502 (FIG. 5) or other component may display a rendering 504 of the transcript 116 to the speaker 102 for review (step 380). The speaker 102 may issue editing commands 506 to the text editor 502 to edit the transcript 116, such as to correct errors in the transcript 116 or to change the formatting of the transcript 116 (step 382). A person other than the speaker 102 may perform such review and editing. Furthermore, more than one person may perform such review and editing. For example, a medical transcriptionist may review and edit the transcript 116 for correctness of language, while a physician may review and edit the transcript 116 for correctness of facts.

Note that rewind events are typically very inaccurate, since the speaker 102 typically finds it difficult to rewind to precisely the moment at which he wishes to re-dictate, and because even differences of tens of milliseconds can affect the output of a speech recognizer. As a result, when the speaker 102 rewinds and re-dictates, the speaker 102 may rewind slightly too far, or not quite far enough, resulting in short amounts of words being overwritten when that was not the user's intention, or short amounts of words remaining, when the user's intent was to re-dictate over them.

Figure 6:
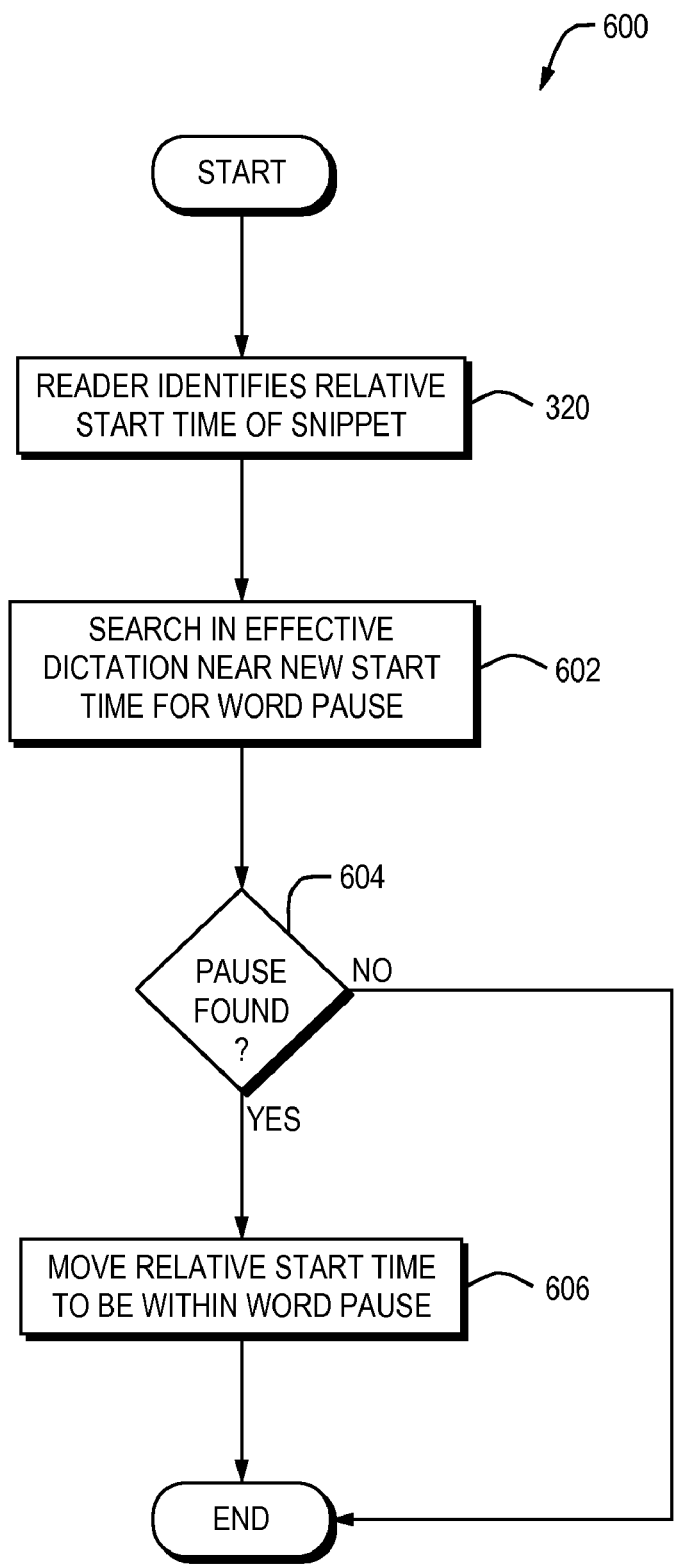
FIG. 6 is a flowchart of a method for adjusting the position at which a snippet is written into a dictation stream so that the snippet begins during a word pause.

One way in which this problem may be addressed is shown by the method 600 of FIG. 6, in which the reader 122 automatically adjusts the write time 134 when the speaker 102 rewinds, so that the new snippet is written into the effective dictation 120 during a silence (word pause). The method 600 may, for example, be performed after step 320 and before step 322 in FIG. 3B.

For example, when the speaker 102 rewinds to a particular new relative start time, the reader 122 may search within the effective dictation 120 near that new start time for a word pause (step 602). If such a word pause is found within a time frame shorter than a typical word (e.g., a few tens of milliseconds) or some other predetermined threshold amount of time (step 604), then the overlap may be assumed to have been in error. In such a case, the reader 122 may adjust the new write time 134 to be equal to the word pause location (step 606). This intelligent automatic repositioning may improve recognition results by eliminating recognition errors that may have been caused by inaccurate rewind positioning by the speaker 102.

Among the advantages of embodiments of the invention are one or more of the following. Embodiments of the present invention perform transcription in real-time, i.e., as speech 104 is being spoken or played back, even when transcribing audio streams including editing operations. No delay need be introduced after a partial audio stream is spoken or played and before it is transcribed or otherwise processed. As a result, transcriptions of the speech 104 may be produced more quickly.

In addition to the benefit of enabling transcripts to be used more quickly, increased transcription speed facilitates editing of the transcript 116 by the speaker 102 himself, rather than by a third party, which may reduce transcription costs. Furthermore, increased transcription speed may increase transcription quality by enabling the speaker 102 to correct errors while they are fresh in the speaker's mind.

The techniques disclosed herein may incorporate any editing operations performed during dictation into the final transcript 116. As a result, the increased speed obtained from real-time processing does not require any sacrifice in transcription quality.

Furthermore, the techniques disclosed herein may be applied to audio streams produced by speaking naturally. For example, the speaker 102 may rewind, forward, or pause the recording while dictating, and such editing operations may be reflected in the final transcript 116. As a result, the benefits of the techniques disclosed herein may be obtained without requiring speakers to change their dictation behavior.

Furthermore, the techniques disclosed herein may be performed without the need to display speech recognition results to the speaker 102, unlike a variety of conventional systems which require the speaker 102 to make edits by editing the text of a draft transcript produced by the system. The ability to avoid the need for such text editing makes the techniques disclosed herein particularly suitable for use with handheld recording/transmission devices (such as handheld voice recorders and cell phones) and in situations where the speaker 102 does not have access to a computer with a display. Even when a display is available, eliminating the need for a text display may free the speaker 102 to focus on dictating and on visual tasks (such as reading a radiology images) other than editing text.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The recording device 106 may be any kind of device. The recording device 106 may be or include software executing on a computer. Although only the transmitted dictation stream 108 is shown in FIG. 1, the recording device 106 may also store the dictation stream 108, or its equivalent, within the recording device or in another storage medium. Some or all of the dictation 108 may be deleted from the recording device 106 at any time after it is transmitted to the consumer 114.

Furthermore, although the recording device 106 and consumer 114 are shown in FIG. 1 as different devices communicating over the network 112, this is merely an example and does not constitute a limitation of the present invention. The recording device 106 and consumer 114 may, for example, be implemented within a single device. For example, the recording device 106 and consumer 114 may both be implemented in software executing on the same computer.

The network 112 may be any mechanism for transmitting the dictation stream 108. For example, the network 112 may be the public Internet or a LAN.

Although the performance of an editing operation is described herein as a trigger for dividing up the dictation 104 into snippets 110a-n, the dictation 104 may be divided into snippets 110a-n in other ways. For example, the recording device 106 may terminate the current snippet and create a new snippet periodically, e.g., every 5 seconds, even if the speaker 102 does not perform an editing operation. As another example, the recording device 106 may terminate the current snippet and create a new snippet after each long pause in the dictation 104, or after some predetermined number of shorter pauses.

Figure 7:
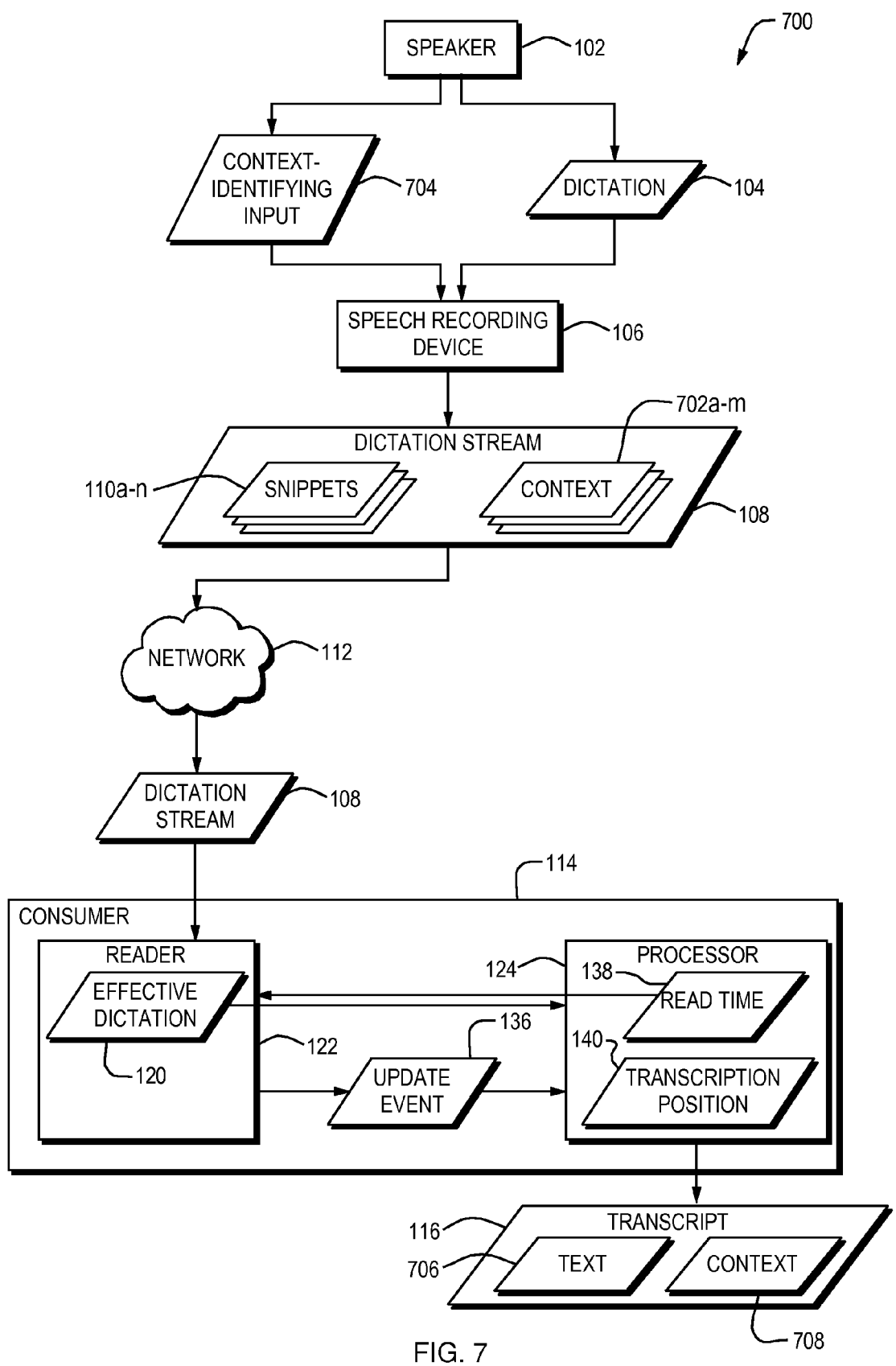
FIG. 7 is a dataflow diagram of a system for storing contextual information in the dictation stream of FIG. 1.

The recording device 106 may record data in addition to audio data, as shown in FIG. 7, which illustrates a modification 700 to the system 100 of FIG. 1. Certain elements from FIG. 1 are omitted from FIG. 7 merely for ease of illustration.

Consider an example in which the speaker 102 is a physician who is dictating a report about radiology images while viewing those images on a monitor, as displayed by radiology software. When the physician dictates comments about a particular such image, the recording device 106 may record PACS (picture archiving communication system) information about the image, and transmit that information (including the image itself) within the dictation stream 108.

Such image information is merely one example of information 702a-m about the context of the dictation stream speech which may be transmitted within, or otherwise in association with, the dictation stream 108 itself. As a result, the dictation stream 108 may not merely be an audio stream, but more generally be a multimedia stream resulting from multimodal input (e.g., speech and keyboard input) provided by the speaker 102.

As a result, the audio (snippets 110a-n) in the dictation stream 108 may be correlated with any additional contextual information 702a-m that is associated with the audio 110a-n. Such correlation may be performed in any of a variety of ways. For example, an image may be correlated with one or more of the snippets 110a-n by stamping that image with the absolute start time(s) of the snippet(s). As a result, the consumer 114 may match images or other contextual information 702a-m that it receives with the snippets to which they correspond.

The consumer 114 may, as a result, be not merely a speech recognizer, audio playback device, or other speech processor, but rather more generally may be a multimedia processor. For example, if the processor 124 plays back the dictation stream 108, the processor 124 may further display the images or other contextual information 702a-m associated with each snippet while the processor 124 plays back that snippet, thereby allowing the reviewer/editor to see or otherwise review the contextual information associated with the dictation stream 108 at the appropriate times.

The recording device 106 may decide whether to attach contextual information 702a-m to the dictation stream 108 in any of a variety of ways. For example, if the speaker 102 is viewing images as described above, the recording device 106 may automatically attach information about each image in association with the portion of the dictation stream 108 that is being dictated while that image is viewed. As another example, the recording device 106 may, by default, not transmit image information with the dictation stream 108, but rather only transmit information about images specified by the speaker 102. For example, if the speaker 102 considers a particular image to be important, the speaker 102 may hit a predetermined hotkey or provide other input 704 instructing the recording device 106 to attach information about that particular image to the dictation stream 108, in response to which the recording device 106 may do so.

If instead, for example, the consumer 114 is an automatic speech recognizer, then when the consumer receives the dictation stream 108, the processor 124 may store the recorded images or other context information 708 within the transcript 116. The transcript 116 may, for example, be a structured document of the kind described in the above-referenced patent application entitled, "Automated Extraction of Semantic content and Generation of a Structured Document from Speech." The context information 708 within the transcript 116 may link to the text that corresponds to the speech dictated by the speaker 102 at the time the context information was created. As a result, the image that was viewed by the speaker 102 may be displayed next to the text that describes the image when that text is displayed by the text editor 502.

Although in particular examples described herein speech recognition is performed by an automatic speech recognizer operating on a server, this is merely an example and does not constitute a limitation of the present invention. Rather, speech recognition and other processing may be performed at any location and need not occur within a client-server environment.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

The invention claimed is:

1. A computer-implemented method comprising:
   (A) generating a first partial audio stream representing first speech of a speaker;
   (B) associating with the first partial audio stream a first time relative to a reference point in a dictation stream, of which the first partial audio stream is a part;
   (C) generating a second partial audio stream representing second speech of the speaker;
   (D) associating with the second partial audio stream a second time relative to the reference point in the dictation stream, of which the second partial audio stream is a part, wherein the first and second partial audio streams are not contiguous in time relative to the reference point; and
   (E) at a consumer:
      (1) receiving the first partial audio stream;
      (2) writing the first partial audio stream into an effective dictation stream at a position based on the first time;
      (3) receiving the second partial audio stream;
      (4) writing the second partial audio stream into the effective dictation stream at a position based on the second time; and
      (5) consuming at least part of the effective dictation to produce output before completion of (E)(4).

2. The method of claim 1, wherein (E)(5) comprises consuming at least part of the effective dictation to produce output before completion of (E)(3).

3. The method of claim 1, wherein (E)(2) is completed before (C) is completed.

4. The method of claim 1, wherein (E)(1) is initiated before (A) is completed.

5. The method of claim wherein (B) comprises associating with the first partial audio stream a first start time relative to a start time of the dictation stream, and wherein (D) comprises associating with the second partial audio stream a second start time relative to the start time of the dictation stream.

6. The method of claim 1, wherein (E)(1) comprises receiving the first partial audio stream over a network.

7. The method of claim 1, further comprising:
   (F) before (C), receiving input from the speaker specifying an editing operation on the dictation stream; and
   (G) terminating the first partial audio stream and initiating the second partial audio stream in response to the editing operation input.

8. The method of claim 7, wherein (F) comprises receiving first input from the speaker specifying that a relative start time of the dictation stream is to be changed to a new relative start time, and receiving second input from the speaker specifying that the dictation stream is to be resumed at the new relative start time; and
   wherein the second time of the second partial audio stream is earlier relative to the reference point in the dictation stream than the first time of the first partial audio stream.

9. The method of claim 1, wherein (E)(5) comprises playing back at least part of the effective dictation.

10. The method of claim 1, wherein (E)(5) comprises applying automatic speech recognition to the effective dictation to produce a transcript of the effective dictation.

11. The method of claim 10, wherein (E)(5) further comprises displaying the transcript to a user only after completion of (E)(4).

12. The method of claim 11, wherein (E)(4) comprises:
   (E)(4)(a) identifying a word pause within the effective dictation at a time that is within a predetermined threshold of the second time of the second partial audio stream; and
   (E)(4)(b) writing the second partial audio stream into the effective dictation at the time identified in (E)(4)(a).

13. The method of claim 1, further comprising:
   (F) identifying contextual information associated with the first partial audio stream;
   (G) associating the first time of the first partial audio stream with the contextual information; and (H) at the consumer, receiving the contextual information in association with the first time of the first partial audio stream.

14. The method of claim 13, wherein (E)(5) comprises consuming the first partial audio stream and the contextual information to produce output reflecting the first partial audio stream and the contextual information.

15. The method of claim 13, wherein (F) comprises receiving input from the speaker identifying the contextual information.

16. The method of claim 13, wherein the contextual information comprises an image.

17. An apparatus comprising:
first partial audio stream generation means for generating a first partial audio stream representing first speech of a speaker;
first relative time means for associating with the first partial audio stream a first time relative to a reference point in a dictation stream, of which the first partial audio stream is a part;
second partial audio stream generation means for generating a second partial audio stream representing second speech of the speaker;
second relative time means for associating with the second partial audio stream a second time relative to the reference point in the dictation stream, of which the second partial audio stream is a part, wherein the first and second partial audio streams are not contiguous in time relative to the reference point; and
a consumer comprising:
first reception means for receiving the first partial audio stream;
first writing means for writing the first partial audio stream into an effective dictation stream at a position based on the first time;
second reception means for receiving the second partial audio stream;
second writing means for writing the second partial audio stream into the effective dictation stream at a position based on the second time; and
consumption means for consuming at least part of the effective dictation to produce output before completion of writing the second partial audio stream.

18. The apparatus of claim 17, wherein the consumption means comprises means for consuming at least part of the effective dictation to produce output before completion of receiving the second partial audio stream.

19. The apparatus of claim 17, wherein the first writing means comprises means for writing the first partial audio stream before generating the second partial audio stream is completed.

20. The apparatus of claim 17, wherein the first reception means comprises means for beginning to receive the first partial audio stream before generating the first partial audio stream is completed.

21. A computer-implemented method comprising:
(A) generating a first partial audio stream representing first speech of a speaker;
(B) associating with the first partial audio stream a first time relative to a reference point in a dictation stream, of which the first partial audio stream is a part;
(C) generating a second partial audio stream representing second speech of the speaker;
(D) associating with the second partial audio stream a second time relative to the reference point in the dictation stream, of which the second partial audio stream is a part; and
(E) at a consumer:
(1) receiving the first partial audio stream over a network;
(2) writing the first partial audio stream into an effective dictation stream at a position based on the first time;
(3) receiving the second partial audio stream over the network;
(4) writing the second partial audio stream into the effective dictation stream at a position based on the second time; and
(5) consuming at least part of the effective dictation to produce output before completion of (E)(4).

22. The method of claim 21, further comprising:
(F) before (C), receiving first input from the speaker specifying a pause of the dictation stream, and receiving second input from the speaker specifying a resumption of the dictation stream.

23. An apparatus comprising:
first generation means for generating a first partial audio stream representing first speech of a speaker;
first association means for associating with the first partial audio stream a first time relative to a reference point in a dictation stream, of which the first partial audio stream is a part;
second generation means for generating a second partial audio stream representing second speech of the speaker;
second association means for associating with the second partial audio stream a second time relative to the reference point in the dictation stream, of which the second partial audio stream is a part; and
a consumer comprising:
first reception means for receiving the first partial audio stream over a network;
first writing means for writing the first partial audio stream into an effective dictation stream at a position based on the first time;
second reception means for receiving the second partial audio stream over the network;
second writing means for writing the second partial audio stream into the effective dictation stream at a position based on the second time; and
consumption means for consuming at least part of the effective dictation to produce output before completion of writing the second partial audio stream.

24. The apparatus of claim 23, further comprising:
third reception means for receiving first input from the speaker specifying a pause of the dictation stream before generation of the second partial audio stream; and
fourth reception means for receiving second input from the speaker specifying a resumption of the dictation stream.

* * * * *

UNITED STATES PATENT AND TRADEMARK OFFICE
CERTIFICATE OF CORRECTION

| | | |
|---|---|---|
| PATENT NO. | : 7,869,996 B2 | Page 1 of 1 |
| APPLICATION NO. | : 11/944517 | |
| DATED | : January 11, 2011 | |
| INVENTOR(S) | : Eric Carraux et al. | |

It is certified that error appears in the above-identified patent and that said Letters Patent is hereby corrected as shown below:

In column 5 line 24, delete "dication" and insert -- dictation --, therefor.

In column 12, line 25, in Claim 5, delete "claim" and insert -- claim 1, --, therefor.

Signed and Sealed this
Twenty-fourth Day of May, 2011

David J. Kappos
*Director of the United States Patent and Trademark Office*